(12) United States Patent
Malan et al.

(10) Patent No.: US 8,103,755 B2
(45) Date of Patent: Jan. 24, 2012

(54) APPARATUS AND METHOD FOR MANAGING A PROVIDER NETWORK

(75) Inventors: Gerald R. Malan, Ann Arbor, MI (US); Robert Stone, Ann Arbor, MI (US); David Langhorst, Ann Arbor, MI (US)

(73) Assignee: Arbor Networks, Inc., Chelmsford, MA (US)

( * ) Notice: Subject to any disclaimer, the term of this patent is extended or adjusted under 35 U.S.C. 154(b) by 1304 days.

(21) Appl. No.: 10/188,303

(22) Filed: Jul. 2, 2002

(65) Prior Publication Data

US 2004/0004941 A1    Jan. 8, 2004

(51) Int. Cl.
*G06F 15/173* (2006.01)
*G06F 11/00* (2006.01)

(52) U.S. Cl. .................... 709/223; 709/238; 726/22
(58) Field of Classification Search ........... 709/220–227
See application file for complete search history.

(56) References Cited

U.S. PATENT DOCUMENTS

| | | | |
|---|---|---|---|
| 6,421,719 B1 * | 7/2002 | Lewis et al. | 709/224 |
| 6,708,209 B1 * | 3/2004 | Ebata et al. | 709/223 |
| 6,718,388 B1 * | 4/2004 | Yarborough et al. | 709/227 |
| 6,880,090 B1 * | 4/2005 | Shawcross | 726/14 |
| 6,938,089 B1 * | 8/2005 | Slaby et al. | 709/229 |
| 6,978,422 B1 * | 12/2005 | Bushe et al. | 715/734 |
| 7,062,782 B1 * | 6/2006 | Stone et al. | 726/22 |
| 7,145,871 B2 * | 12/2006 | Levy et al. | 370/229 |
| 7,159,031 B1 * | 1/2007 | Larkin et al. | 709/238 |
| 7,177,884 B2 * | 2/2007 | Gnaedig | 707/200 |
| 7,325,058 B1 * | 1/2008 | Sheth et al. | 709/225 |
| 2003/0177344 A1 * | 9/2003 | Harvey, IV | 713/1 |
| 2003/0200441 A1 * | 10/2003 | Jeffries et al. | 713/181 |
| 2003/0204621 A1 * | 10/2003 | Poletto et al. | 709/239 |
| 2004/0064541 A1 * | 4/2004 | Ebata et al. | 709/223 |

* cited by examiner

*Primary Examiner* — Peling Shaw
*Assistant Examiner* — Joiya Cloud
(74) *Attorney, Agent, or Firm* — Lando & Anastasi, LLP

(57) ABSTRACT

An administration system is defined that provides an interface between a subscriber and resources on a provider network. The subscriber, via the administration system, has access to and control over certain of the resources on the provider network. The subscriber may have access to and control over only those resources on the provider network related to the services provided to his network. Also, the subscriber may not be capable of altering resources on the provider network in a way that affects the services provided to another subscriber. Because the administration system allows a user to control resources on the provider network that relate to services provided to his network, the amount of support required by the provider to administer those resources is reduced.

50 Claims, 11 Drawing Sheets

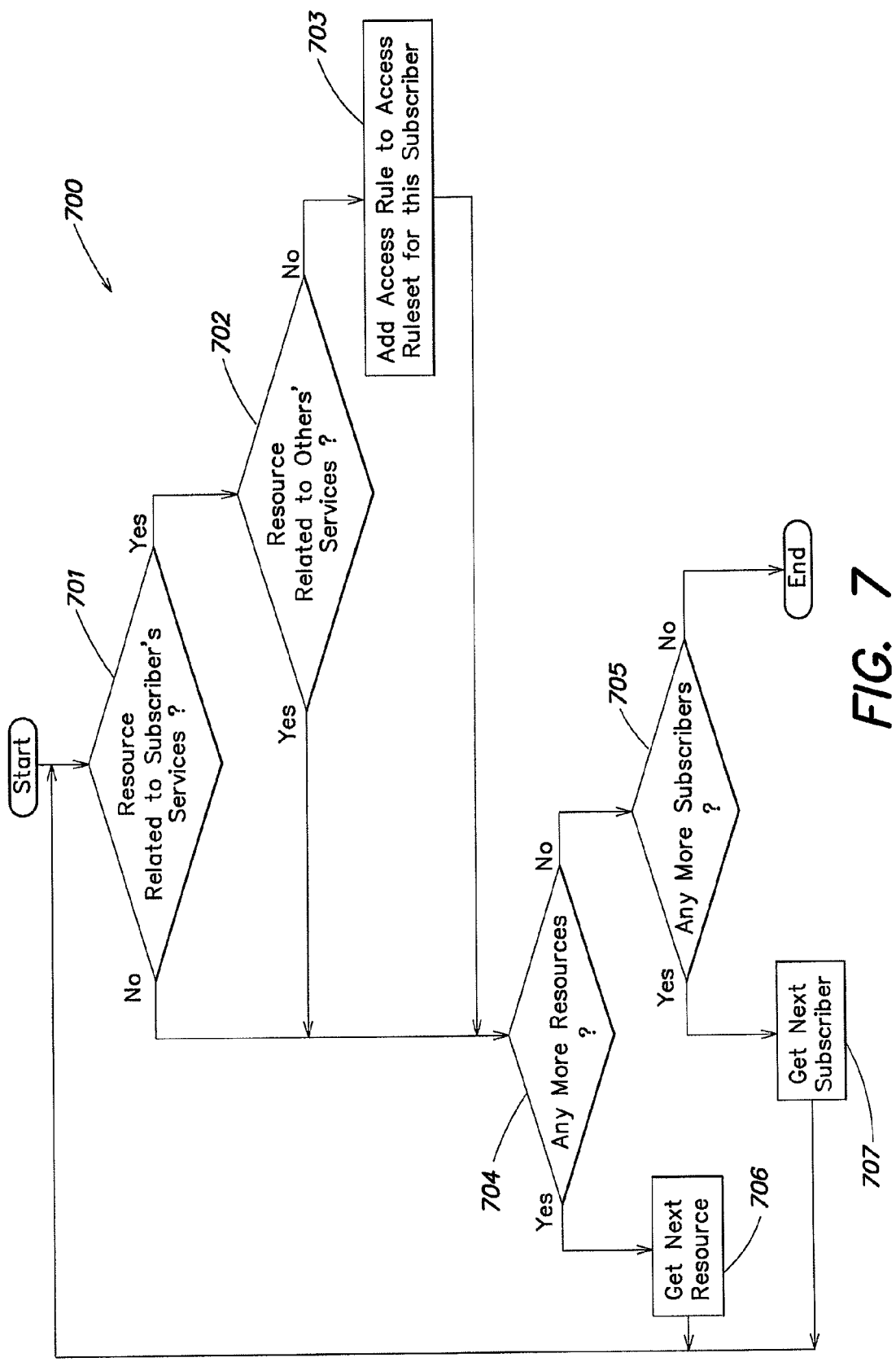

APPARATUS AND METHOD FOR MANAGING A PROVIDER NETWORK

FIELD OF THE INVENTION

This invention relates generally to communications networks, and more specifically, the invention relates to managing communications networks.

BACKGROUND OF INVENTION

The explosion of technological growth has resulted in many opportunities, particularly in the areas of information sharing and dissemination via computers and computer networks. Many individuals and enterprises currently strive to take full advantage of computer networking technology for marketing and information transport. To this end, many have subscribed to services delivered by service providers, such services including Internet connectivity and web page hosting, and others.

To provide these services, providers generally connect their networks to a subscriber's network or computer system. Both the subscriber and provider networks have their own resources such as routers, hubs, bridges and software. Resources within the respective networks can only be upgraded, changed or modified by staff members of the respective organizations. This arrangement affects the way in which the networks are managed. For example, if the subscriber wishes to modify the services provided to him/her, he/she has to lodge a request with the service provider. Typically, a member of the service provider's staff then carries out the request by making the appropriate changes on the provider network equipment. Performing configuration changes for customers and responding to customer service requests make up a majority of service costs for maintaining a service provider network.

SUMMARY OF THE INVENTION

Configuration changes made to resources in the provider network on behalf of the subscriber can be time consuming. They require significant provider resources including staff and man hours. These configuration changes and customer service responses can make up a majority of operating costs for maintaining a service provider. According to one aspect of the invention, a system and method is provided for managing a provider network wherein access control of resources is granted to subscribers. Conventionally, control of these resources is performed exclusively by the provider.

In one aspect of the invention, a method is provided for managing a network configuration management of a provider network comprising determining a first network resource over which the subscriber has control, receiving at least one network configuration change related to the first network resource from the subscriber, and implementing the received network configuration change. In one aspect of the embodiment, at least one network configuration option is also provided to the subscriber. This at least one network configuration option may include, according to various embodiments of the invention, a change in a router configuration and/or a filter configuration. The first network resource includes at least one filter policy or network route, according to various embodiments of the invention. In one aspect of the invention, the network configuration change affects only the first network resource. In another embodiment of the invention the first network resource is located within the provider network. According to various embodiments of the invention, the network configuration change affects an entity located in the provider network, at least one service provided to the subscriber and/or an entity under control of the provider. According to another embodiment of the invention, the method further comprises verifying an identity of the subscriber to permit the act of implementing the received network configuration change.

In one aspect of the invention the first network resource includes a filter entry stored in a memory of a network communication system. This network communication system may be, according to various embodiments of the invention, a router or bridge.

According to another aspect of the embodiment, the method further comprises detecting a denial of service attack on the subscriber and providing the subscriber with a mitigation option. According to this embodiment, the at least one network configuration change is the mitigation option. According to one aspect of the embodiment, providing the subscriber with a mitigation option may comprise providing a subscriber with a plurality of mitigation options. In this aspect the at least one network configuration change is one of the plurality of mitigation options. According to another aspect of the invention, the method further comprises determining an amount of a network owned by the subscriber afflicted by the denial of service attack. In one embodiment of the invention, the mitigation option is based on the amount of the subscriber network afflicted by the denial of service attack. According to another embodiment of the invention, the method further comprises determining a source of the denial of service attack. According to an aspect of this embodiment, the mitigation option is based on the source of denial of service attack.

In one aspect of the invention, the method further comprises alerting the subscriber of the denial of service attack. Detecting the denial of service attack may comprise receiving, from the subscriber, an indication the subscriber is under attack, according to another embodiment of the invention.

In another aspect of the embodiment, the method further comprises providing network configuration options to the subscriber. According to an aspect of this embodiment, the received network configuration change includes one of the network configuration options.

In another aspect of the embodiment, the method further comprises determining a second network resource over which a second subscriber has control and denying control over the second network resource to the subscriber. One aspect of this embodiment further comprises receiving a second configuration change related to the second network resource from the second subscriber and implementing the received second network configuration change. In another aspect of the embodiment the first network resource and the second network resource are not the same. The second network configuration change affects at least one service provided to the second subscriber, according to another aspect of the embodiment.

In one aspect of the embodiment, the method further comprises determining a second network resource over which a second subscriber has control, receiving a second network configuration change related to the second network resource from the second subscriber, and implementing the received second network configuration change. According to an aspect of this embodiment, the method further comprises denying, to the subscriber, control over the second network resource.

In another aspect of the invention, the method further comprises assigning control of a second network resource included in the first network resource to a first administrator of the subscriber, assigning control of a third network resource included in the first network resource to a second administrator of the subscriber, receiving a second network configuration change related to the second network resource from the first administrator and implementing the received second network configuration change. In one aspect of this embodiment, the second network resource and the third network resource are not the same; in another aspect of the embodiment, the second network resource includes the third network resource. The method further comprises providing a network configuration option to the first administrator, according to another aspect of the embodiment. In this aspect, the second network configuration change submitted by the first administrator may include the network configuration option. In another aspect of this embodiment, the method further comprises verifying the identity of the first administrator to permit the act of implementing the received second network configuration change. The second network resource may include at least one filter policy and/or a network route, according to various embodiments of the invention. According to another embodiment of the invention, the second network resource is located within the provider network. According to various embodiments of the invention, the second network configuration change affects only the second network resource, an entity located in the provider network, and/or at least one service provided to the subscriber, among other things.

According to another aspect of the embodiment, the method further comprises receiving a third network configuration change from the second administrator and implementing the received third network configuration change submitted by the second administrator. This aspect may further comprise providing a second network configuration option to the second administrator. The third network configuration change may include the second network configuration option, according to another embodiment of the invention. According to yet another aspect of the invention the second network configuration option includes at least one of adding, to network communication device, a filter entry and modifying, in the network communication device, a network route. According to another aspect to the invention the method further comprises verifying the identity of the second administrator to permit the act of implementing the received third network configuration change.

In one aspect of the invention, a method is provided for administering a network providing a plurality of services to a subscriber comprising associating capabilities related to administration of at least one of the plurality of services with the subscriber, storing a rule that relates to the at least one of the plurality of services provided to the subscriber, and implementing the rule. In one aspect of the embodiment, the rule affects only the services provided to the subscriber. The capabilities may include, according to various aspects of the invention, altering at least one entry stored in a routing table and/or controlling at least one filter policy. In another aspect of the embodiment the method further comprises storing a record of implemented rules. The act of storing a record of the implemented rules, according to another aspect of the embodiment, comprises storing a record relating to a configuration change request received from a subscriber. According to another aspect of the invention, the method further comprises responding to queries regarding the implemented rules. The method may also comprise performing relational accounting on the implemented rules, according to another aspect of the invention.

In one embodiment of the invention, the method further comprises receiving a network configuration change request from the subscriber based on the capabilities, and formulating the rule based on the request. According to this embodiment, an intended scope of the request is different from an actual scope of the implemented rule. According to one aspect of this embodiment, the method further comprises recording the intended scope and the actual scope.

In one aspect of the invention, a method is provided for administering a network providing service to a plurality of subscribers comprising mapping a set of resources including at least one network resource to at least one of the plurality of subscribers, storing the mapping, and allowing access control to the network resource based on the mapping. The at least one network resource includes, according to various embodiments of the invention, a network route and/or a filter entry stored in a network communication system. According to another aspect of the embodiment, the method may further comprise responding to queries relating to the set of resources.

In one aspect of the invention, a method of mitigating a denial of service attack on a subscriber to a provider network is provided. The method comprises associating faculties with the subscriber, alerting the subscriber of the denial of service attack, providing the subscriber options (based on the faculties) for mitigating the denial of service attack, and implementing an option selected by the subscriber. In one aspect of the embodiment, the faculties include the ability to control one or more filter policies of the provider network. In another aspect of the embodiment the act of implementing the option includes changing a configuration of a network communication system. The option selected by the subscriber only affects the services provided to the subscriber, in another aspect of the embodiment. According to another aspect of the embodiment, the act of associating faculties with the subscriber comprises determining at least one network resource over which the subscriber has control, and associating capabilities relating to the control of the at least one network resource with the subscriber.

Further features and advantages of the present invention as well as the structure and operation of various embodiments of the present invention are described in detail below with reference to the accompanying drawings. In the drawings, like reference numerals indicate like or functionally similar elements. Additionally, the left-most one or two digits of a reference numeral identifies the drawing in which the reference numeral first appears.

BRIEF DESCRIPTION OF THE DRAWINGS

This invention is pointed out with particularity in the appended claims. The above and further advantages of this invention may be better understood by referring to the following description when taken in conjunction with the accompanying drawings in which similar reference numbers indicate the same or similar elements.

In the drawings,

FIG. 7 is a flow diagram of a process for managing resources according to one embodiment of the invention;

DETAILED DESCRIPTION

Figure 1:
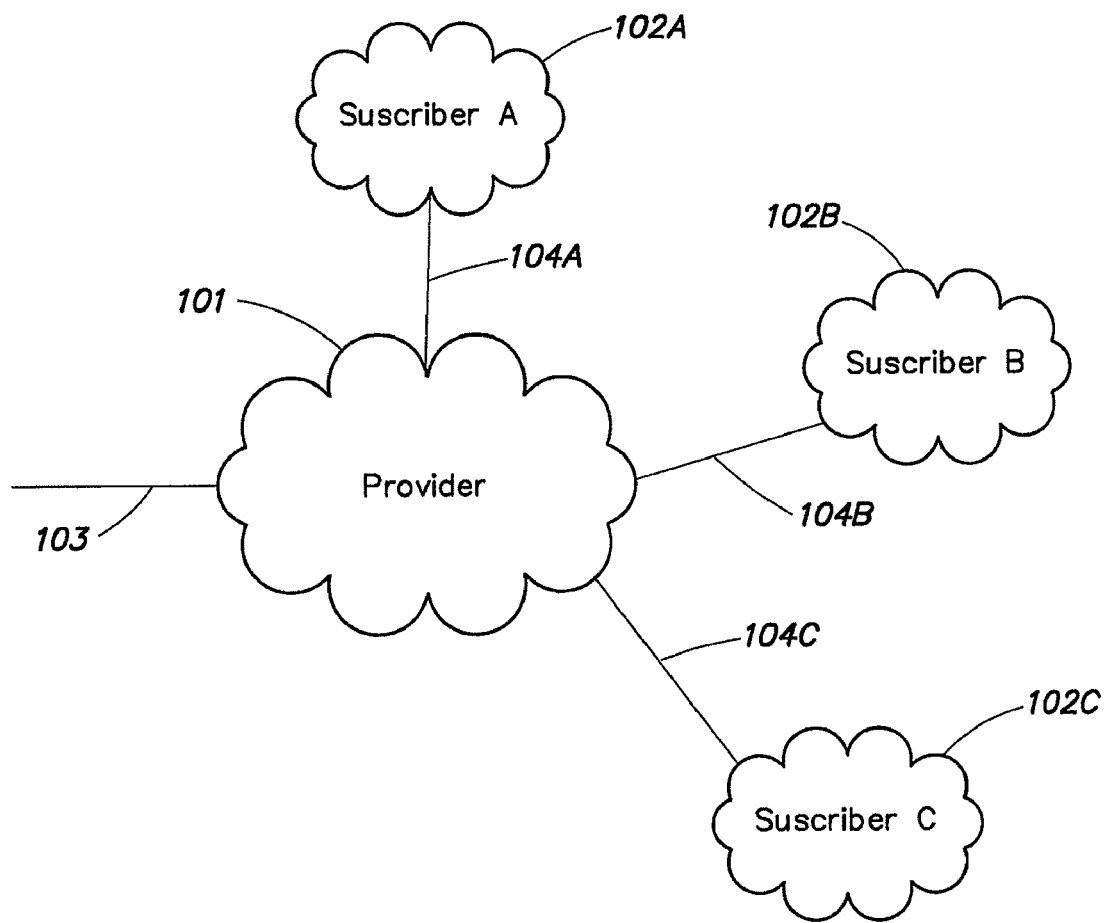
FIG. 1 illustrates an environment in which various embodiments of the invention may be used.

FIG. 1 illustrates an example environment in which the invention may be employed. A provider network 101 provides services to clients known as subscribers. Services provided by the provider network may include, for example, internet connectivity, website hosting, and voicemail services, among others. In the example illustrated, a subscriber network 102A, subscriber network 102B and subscriber network 102C receive one or more of the services provided by provider network 101.

To provide such services, provider network 101 is connected to the subscriber networks by communication links 104A, 104B and 104C. Communication links 104A-104C may be, for example, T1, ISDN, ATM, DSL, cable, or any other type of communication media used to communicate information between a provider and subscriber network. More specifically, communication links 104A-104C may be any passive (e.g. cables or other media) or active elements (e.g. switches, hubs, routers, etc.) used to communicate information. The provider network 101 may also be connected to a Network Access Point (NAP) or directly to other provider networks via trunk link 103. It should be noted that, although the subscriber networks are connected to the provider network, there is a distinct boundary between entities that the subscriber controls and those entities that the provider controls. This boundary of control may be drawn, for example, within the subscriber, provider, or any link between these networks.

Figure 2:
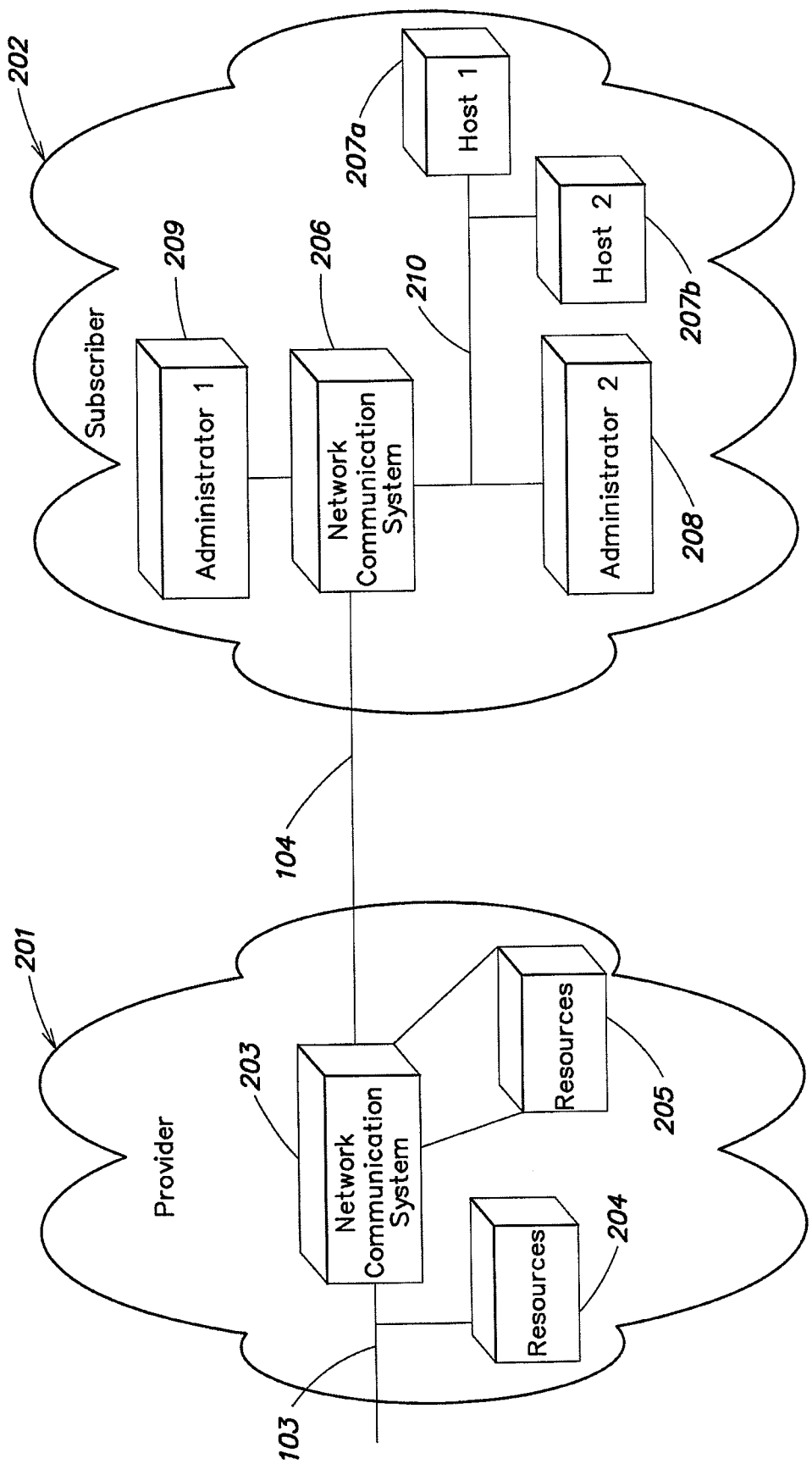
FIG. 2 shows a computer network environment in which various embodiments of the invention may be used.

A more detailed illustration of a provider network, a subscriber network and the interconnection between them is shown in FIG. 2. As in FIG. 1, provider network 201 may be connected to a network access point via trunk link 103, and is connected to subscriber network 202 via link 104. Within provider network 201 is a network communication system 203 that provides network communication services to subscriber network 202. Provider network 201 also includes one or more resources 204 that are under control of the provider. Resources 205, which are part of network communication system 203, are also considered to be part of provider network 201 and are generally under the control of the provider.

A network communication system 206, located in subscriber network 202, is coupled to link 104. A first administrator 209 that performs administrative functions with regard to subscriber network 202, may be configured to communicate with network communication system 206 to perform administrative functions on system 206. Administrator 209 may be, for example, an administrator program executing on a general purpose computer system. An example of an administrator program includes a Network Management System (NMS) employed to manage network communication devices. Other systems, such as second administrator 208, and hosts 207A and 207B may be coupled to network communication system 206 via a network bus 210.

While subscriber network 202 is shown as single network, it should be appreciated that subscriber network 202 may include a series of networks, one or more intervening communication systems, or the subscriber may be an individual host (for example, a host that accesses directly provider network 201). Also, while the administrator 208 and hosts 207A and 207B are shown connected to the network communication system 206 by a bus, any network topology, such as ring, star or point-to-point connection, could be used. The invention is not limited to any particular network type, size or topology.

Network communication system 203 routes communications between subscriber 202, trunk link 103 and any other networks (not shown) connected to provider network 201. Resources 204 and 205 may facilitate the communications and support the realization of the services provided by the provider. Resources 204 and 205 may include, for example, routing table entries, filter entries, policies, forwarding rules, or other aspect related to the provided services.

Network communication system 206 routes communications between the hosts and administrators, as well as communications between link 104 and the hosts and administrators. Network communication system 206 may also, for example, provide data storage for the hosts and administrators, facilitate print services and/or provide other services for subscriber network 202. Hosts 207A and 207B may be end user machines or devices such as printers or scanners, for example.

Administrators 208 and 209 may have control over resources in network communication system 206 (not shown). The administrators may have the same or different levels of control over the resources in network communication system 206, or they may control different subsets connected to network communication system 206. In a conventional network, however, administrators 208 and 209 are unable to control resources 204 and 205 in provider network 201.

According to one aspect of the invention, a system and method is provided that allows a subscriber to control one or more provider network resources related to the services provided to the subscriber. According to one embodiment of the invention, the subscriber is allowed access to the resources that relate to services provided to the subscriber. The subscriber can modify those resources for example, by changing, appending to or deleting existing operating parameters of the resources. In another aspect of an embodiment of the invention, control of resources in the provider network may be allocated to one or more administrators of the subscriber network.

Figure 3:
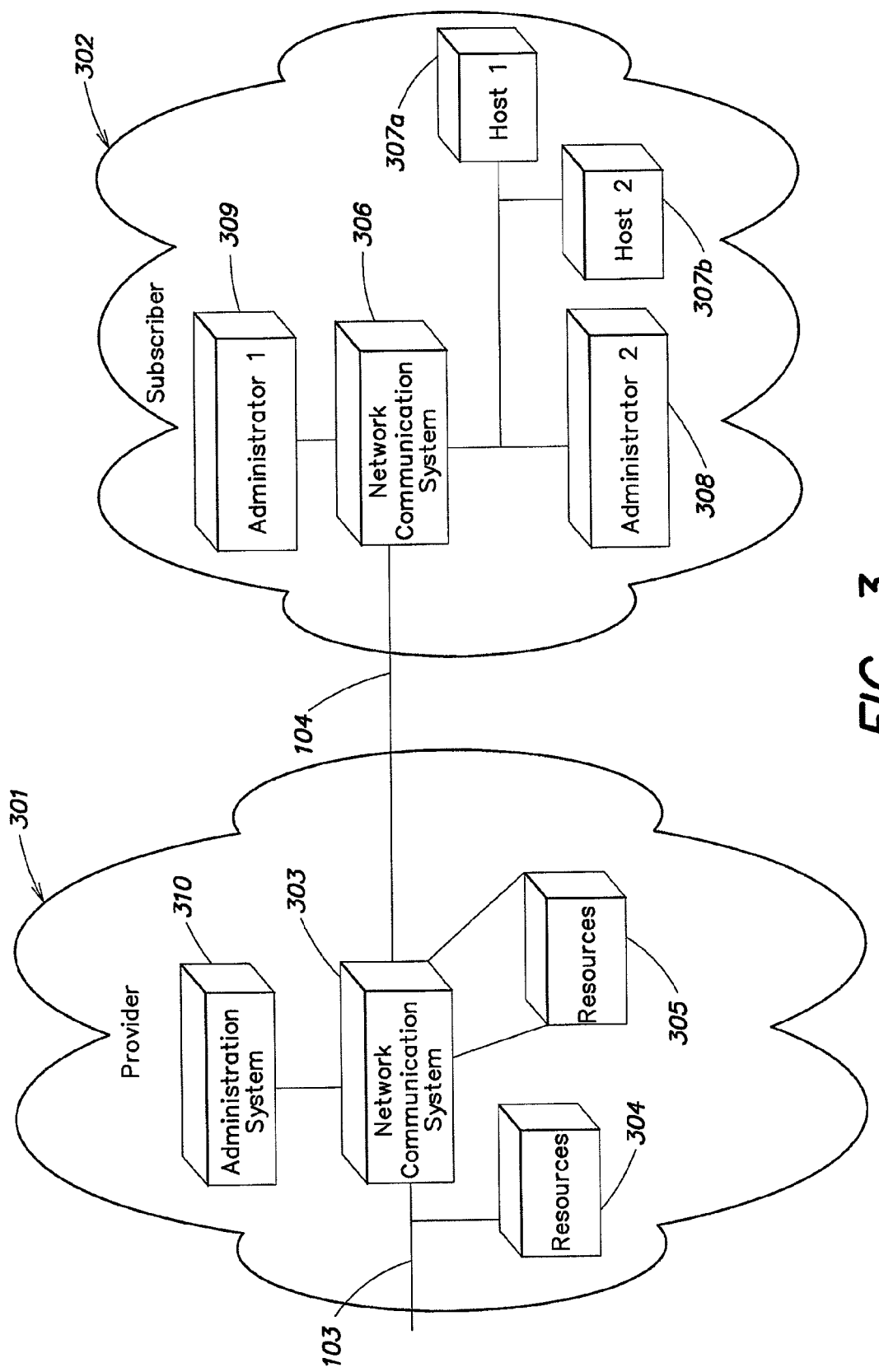
FIG. 3 shows a computer network environment including an embodiment of the invention.

FIG. 3 illustrates one possible implementation of an embodiment of the invention in a network similar to that shown in FIG. 2. Network communication system 303, in addition to being connected to trunk link 103 and link 104, is further coupled to administration system 310. In a similar manner to system 203, network communication system 303 provides services to subscribers and includes resources 305. Resources 304 and 305 facilitate the provision of services by supporting, for example, anomaly detection, routing tables and filter policies. Within subscriber network 302, services are provided to the administrators and hosts via network communication system 306, similar to network communication system 206 shown in FIG. 2. Services provided by the network communication system 306 may include services listed in connection with network communication system 206, for example.

According to one embodiment of the invention, administration system 310 provides an interface between the subscriber and resources 304 and 305. The subscriber (e.g., an administrator that performs administration functions on behalf of a subscriber), via the administration system 310, has access to and control over certain resources. According to one embodiment of the invention, a subscriber has access to only those resources related to the services provided to his network. Also, in another embodiment of the invention, the subscriber cannot alter his resources in a way that effects the services provided to another subscriber. Because administration system 310 allows a user (e.g. an administrator of a subscriber network, or other consumer of resources) to control resources that relate to his own network services, the amount of support required by the provider to administer those resources is reduced.

More particularly, the subscriber controls the resources through network configuration changes implemented by the administration system 310 on his behalf. The network configuration changes in some way affect the services provided to the subscriber, and are generally implemented at the resources. Examples of network configuration changes may include, for example, allocating bandwidth for data transfer, blocking data packets from a certain IP address (e.g., via access control lists (ACLs), implementing firewall filters, instituting routing changes to block traffic, etc.), adjusting network routes related to the subscriber network, and setting an alarm threshold on a network anomaly detection system (not shown). Other network configuration changes may be performed to support the service, and the invention is not limited in any particular change or resource.

Some network configuration changes can be implemented at any time, for any reason by the subscriber. For example, some changes may relate to a general configuration performed on a regular basis (e.g., address changes, name changes, etc.). However, other changes may be allowed to be implemented at particular times, or under particular conditions (e.g., during a denial of service attack, break-in attempt, etc.). Because the scope and specifics of network configuration changes may be characterized and/or performed by the service subscriber, support by the provider is reduced.

Network configuration changes may be stored by administration system 310 as one or more rules or sets of related rules. Rules may be, for example, a formatted change that can be easily encapsulated in a database record, and may include the time of implementation of the change and who requested the change, for example. A subscriber may have control to add, delete or modify rules in a ruleset. Any network configuration change realized by the administration system 310 on behalf of a subscriber may result in an alteration of the rules in that subscriber's ruleset. Network configuration changes may, but do not necessarily, include rules and/or requests in a natural language, for example.

Figure 4:
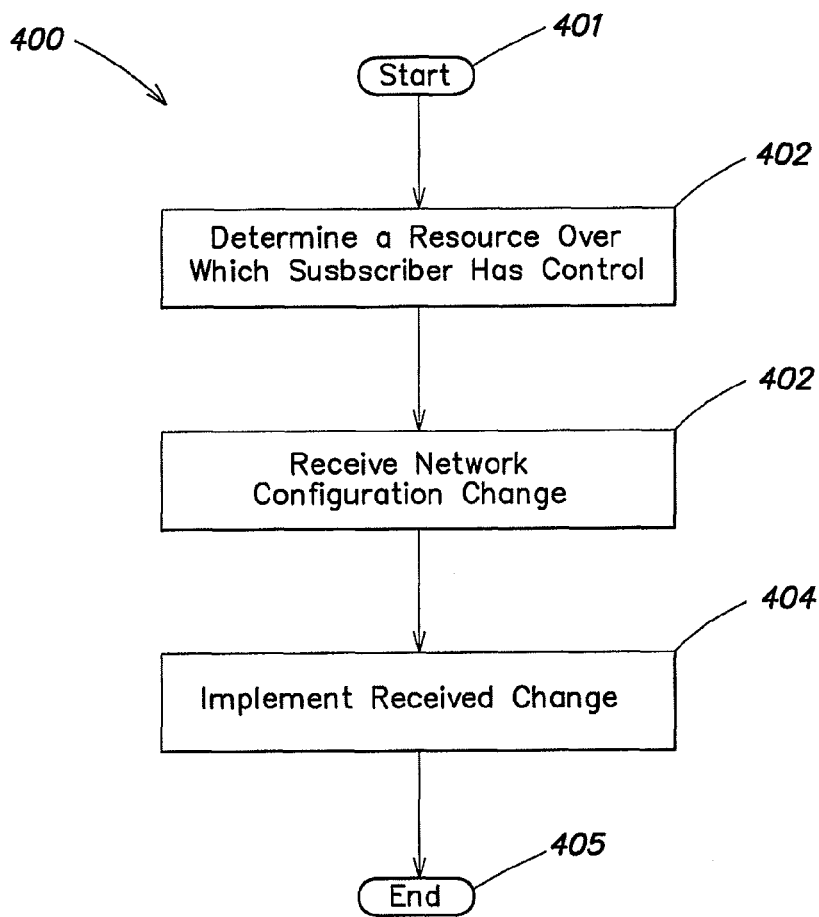
FIG. 4 is a flow diagram of a process of managing resources performed by an embodiment of the invention.

An example of a process 400 for managing resources performed, for example, by administration system 310 is illustrated in FIG. 4. Process 400 begins at block 401, and continues to block 402, in which the administration system 310 determines a resource over which a subscriber has control. Then, at block 403, administration system 310 receives a network configuration change from the subscriber. The network configuration change is related to the services provided to the subscriber, and affects a resource over which the subscriber has control. Administration system 310 implements the received network configuration change with or without operational support in block 404. At block 405, the process executed by the administration system 310 ends.

In one embodiment of the invention, the administration system 310 translates a network configuration change into one or more configuration information items. Configuration information items may include a route add command or a filter policy rule add command executed on network communication system 303, for example. In other words, configuration information items are network configuration changes appropriately formatted for implementation at particular resources. When properly employed, the one or more configuration information items effect a modification of services similar in scope to the desired network configuration change. In another embodiment, a network configuration change may comprise one or more configuration information items.

Figure 5:
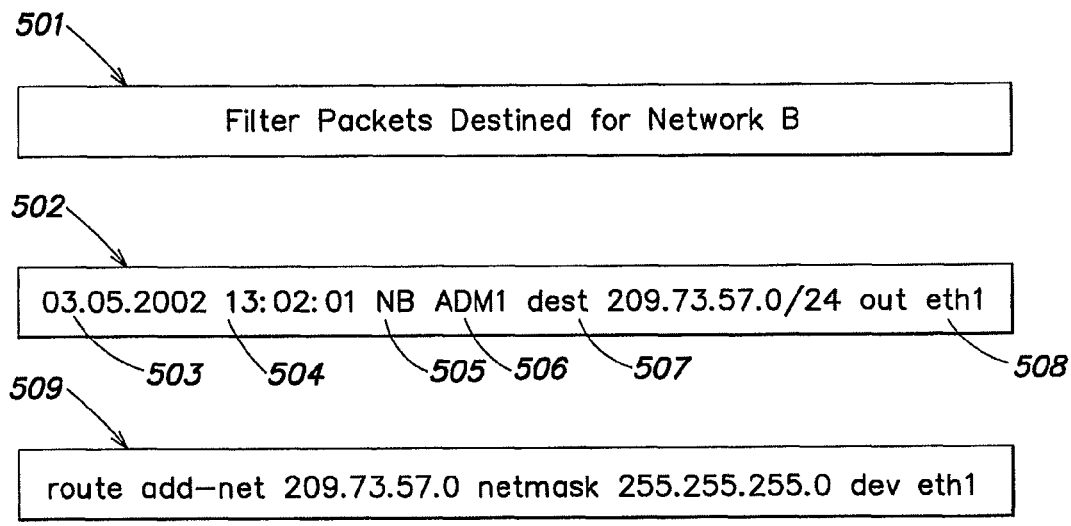
FIG. 5 shows examples of change formats in accordance with aspects of an embodiment of the invention.

FIG. 5 shows examples of a network configuration change, and a rule and configuration information item corresponding to the network configuration change according to an aspect of one embodiment of the invention. Block 501 is a network configuration change submitted to the administration system 310 by a subscriber. The network configuration change shown in block 501 could have been entered, for example, by the subscriber or administrator on his own or it could have been selected from a group of network configuration change options.

Block 502 shows a rule that corresponds to network configuration change 501. Date 503 and 504 indicate the date and time that the rule was implemented, respectively. Network identifier 505 and administrator identifier 506 indicate which network and administrator submitted the rule to the administration system 310, respectively. Characteristic 507 indicates a characteristic of the traffic that is affected by the rule. In this case, any traffic destined for the class C network 209.73.57.0 is affected by the rule. Action 508 indicates the action that will be performed on the affected traffic and may specify a device and interface to which the action is applied. For example, Action 508 specifies that the affected traffic will be output through device eth1. It is assumed, in this example, that a filtering device is attached to eth1. Block 509 shows a configuration information item that corresponds to network configuration change shown in block 501. The configuration information item shown in block 509 is formatted for a specific resource (an entry in a routing table on a hardware system running the Linux operating system, in this example) and effects the change requested by network configuration change 501.

A configuration information item could be, for example, a filter entry created in a communication device. For instance, an access control list (ACL) entry can be created within a Cisco router that blocks packets from a particular source and/or destined for a particular network at a particular interface. This may be performed, for example, by configuring an access list entry from a particular source denying forwarding of packets received from that source (e.g., a particular IP source address), and applying the access list entry to a particular interface of the router. ACLs may be created in a router in many ways, including using the well-known SNMP protocol, HTTP protocol, a command-line interface (CLI) provided by the router or other method.

Although the configuration change may be effected by, for example, a filter implemented in a router, it should be appreciated that any configuration change may be performed. For example, the router may not be capable of performing filtering, and therefore, traffic received from a particular source may be directed to a downstream device (e.g., a bridge or switch) capable of implementing filtering rules. In this case, a filter entry may be created in the downstream device. Other configuration items may be created that affect connectivity or quality of service provided by one or more communication devices.

According to one embodiment of the invention, implementation details relating to configuration changes may be hidden from the subscriber. That is, details such as, for example, configuration changes associated with an option presented to the user may be hidden from the user. In this way, the subscriber does not need to know that to achieve a particular network configuration change, one or more configuration information items need to be implemented at one or more locations within the provider network. Because the subscriber does not require a high degree of technical knowledge to obtain the results that he desires, the system according to various aspects of the invention is more usable. This feature is advantageous to providers that may have many subscribers with varying ranges of technical knowledge.

It should be appreciated that administration system 310 may be implemented in any number of ways. For example, administration system 310 may be implemented on one or more computer systems. These computer systems, may be, for example, general-purpose computers such as those based on an Intel Pentium-type processor, Motorola PowerPC processor, Sun UltraSPARC processor, Hewlett Packard PA-RISC processors, or any other type of processor. Special-purpose, specialized processors or controllers may also be used. Administration system 310 could be implemented as software or specialized hardware on those systems or may be distributed among a plurality of those systems. It should also be appreciated that the administration system may be implemented in software or hardware on a specialized computer system such as a network router. The administration system may also be implemented in a distributed manner across several specialized computer systems.

Figure 6A:
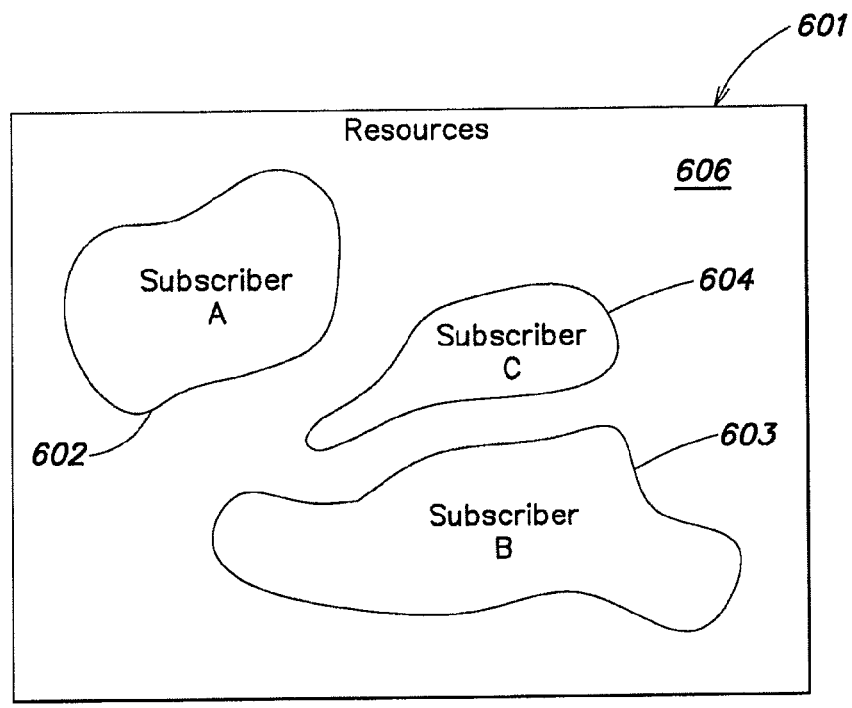
FIG. 6A is a Venn diagram showing resource allocation according to an embodiment of the invention.

FIG. 6A shows one embodiment according to the invention wherein subscribers are permitted to control one or more resources. Relationships between subscribers and resources provided by various aspects of the invention are illustrated in the Venn diagram shown in FIG. 6A. Resources 601 encompass the resources of the provider network. Conventionally, only the provider has control over resources 601. According to one embodiment of the invention, control to one or more of resources 601 is provided to one or more subscribers, e.g., subscribers A-C of FIG. 6. Sets 602, 603 and 604 include one or more resources that are under control of the individual subscribers A-C, respectively.

The resources under the control of the subscribers may include, for example, entries in routing tables, entries in access control lists (ACLs), filter policies, rate limiting parameters (e.g. committed access rate (CAR) parameters), among others. The resources under the control of the subscribers need not be within the provider's network communication system, as shown by resources 304 in FIG. 3. Also, if the network communication system is implemented distributively, the resources under a subscriber's control may also be distributed.

Area 606 within resources 601 encompasses those resources which no subscriber may control. For example, resources beyond the control of subscribers may include operating parameters of the network communication system including protocols used by the network communication system, routing protocol parameters (e.g., OSPF operating parameters), and operating parameters associated with the operating system of the network communication system hardware (e.g., Internetwork Operating System (IOS) operating parameters of a Cisco router).

Figure 6B:
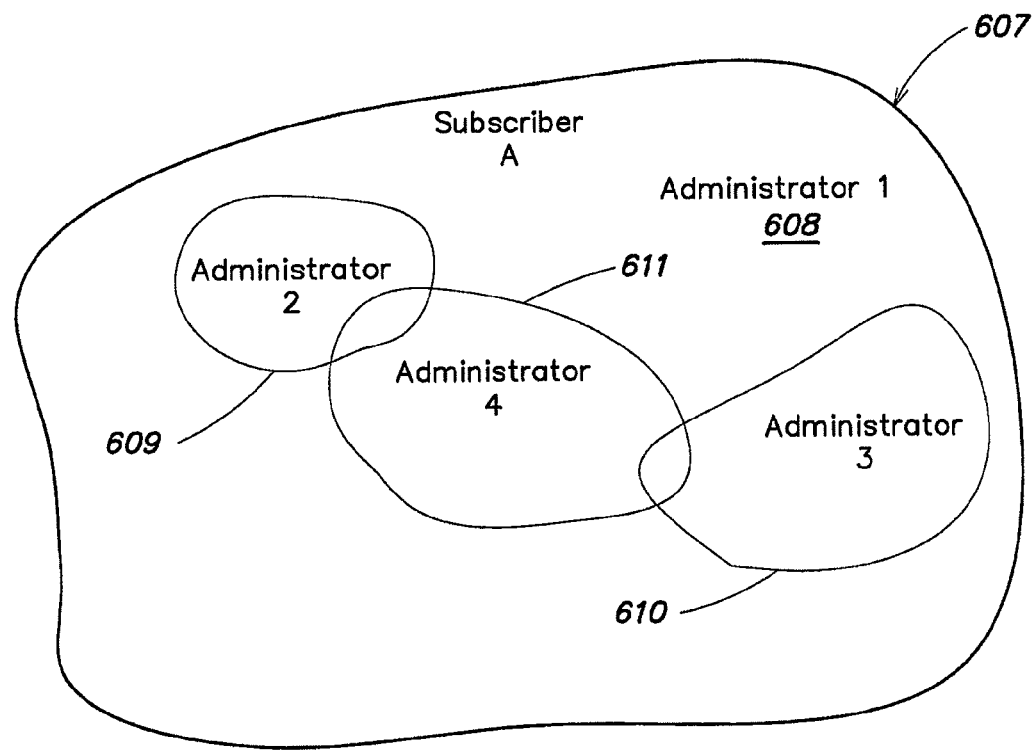
FIG. 6B is a further Venn diagram showing resource allocation according to another embodiment of the invention.

According to one embodiment of the invention, different administrators of a subscriber network may be allocated control over one or more of the provider network resources, as shown in the Venn diagram of FIG. 6B. For example, as discussed above, there may be a set of resources that are under the control of subscriber A, e.g., set 607 of FIG. 6B. According to an embodiment of the invention, one or more administrators may be assigned exclusive or overlapping control of one or more resources in set 607. For example, administrators of particular, separate subnets of a larger network may have control over routing tables, filter policies, ACLs, etc. related to the particular subnets they control but not to any of the other subnets. However, it should be noted that in a further example, two or more administrators that have administrative responsibilities over the same subnet of a larger network may share control over one or more ACLs and routing tables relating to the subnet, among other resources.

According to the embodiment shown, administrator 1 has control over all of the resources 608 within the set 607. Administrator 2 has control over a subset of the resources 608, shown as set 609, and administrator 3 has control over the subset of the resources shown as set 610. As shown in FIG. 6, administrator 4 has control over the resources shown as set 611, which include at least some of the resources under the control of administrators 2 and 3.

It should be appreciated that FIG. 6B is not exhaustive depiction of the possible ways in which control of resources can be divided between administrators. Further, a subscriber may have as many or as few administrators as the subscriber desires, and a subscriber is not limited to a minimum or maximum number of administrators. The resources could also be arranged such that no administrator shares control of a resource with any other administrator. Access to control of resources may be divided according to other parameters, such as time, geography, or any other method for allocating control. Many other arrangements could be devised and the invention is not limited in this regard.

FIG. 7 is a flow diagram that shows one embodiment of the invention in which a process for determining the resources over which a subscriber has control of FIG. 4 may be implemented. The process 700 begins at block 701, in which a resource is examined to determine whether it is related to a subscriber's services. If the resource is determined to be related to the subscriber services, process 700 continues to block 702. For example, a network route entry (resource) located in a memory of a router that relates to subscriber network many be determined. At block 702, the resource is examined to determine whether it is related to the services provided to another subscriber. If not, process 700 continues to block 703. An access rule is created that indicates that the subscriber has control over the resource, and that rule is added to the subscriber's access ruleset at block 703. This rule may be, for example, an association of a network route (e.g., a resource) with a particular subscriber or subscriber network. The rule may also indicate what type of control the subscriber has over the resource.

An access ruleset may be maintained by an administration system for each subscriber. The access ruleset for a subscriber indicates those resources over which a subscriber has control, and, according to one embodiment of the invention, the ruleset is distinct from a ruleset including network configuration rules.

After adding an access rule to the access ruleset at block 703, or if the resource being examined is not related to the subscriber's services or is related to the services of another subscriber, process 700 continues to block 704. At block 704 it is determined whether there are more provider network resources to be examined. If all of the resources have been examined for the particular subscriber, it is determined whether there are any more subscribers to the provider's services block 705 that have not been examined to determine resources that are under their control. If not, the process of determining resources that are under subscribers' control is complete. However, if there are more resources or more subscribers to be examined, process 700 continues to block 706 or 707, in which the next resource or next subscriber, respectively, is obtained for examining, and process 700 begins again at step 701.

Alternatively, in one aspect of the invention, resources may be allocated to a subscriber and access rulesets may be established manually by staff employed by the provider when the subscriber first subscribes to services. Resources may also be associated with subscribers during an initial discovery process, for example, or may be associated from time to time as resources are added to the network.

Figure 8:
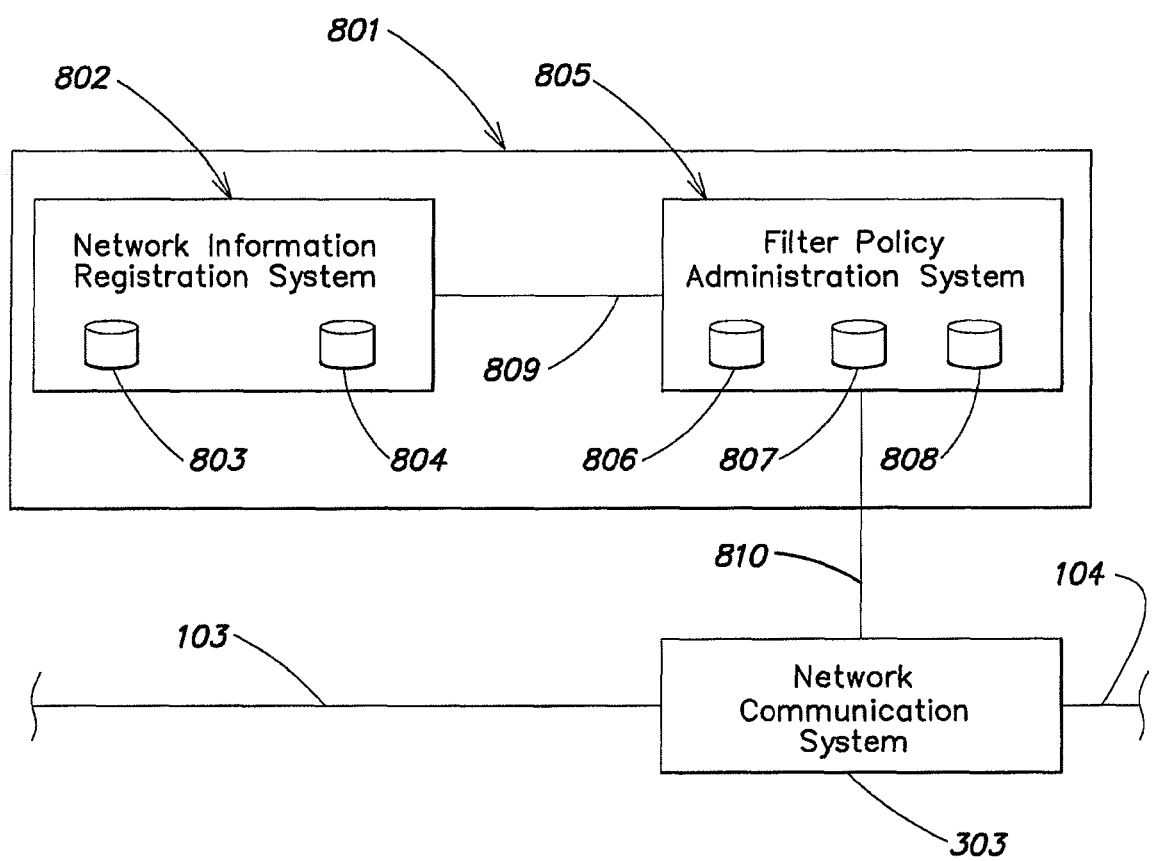
FIG. 8 is an exploded view of an aspect of a management system according to one embodiment of the invention.

FIG. 8 illustrates an embodiment of the invention wherein the administration system is located within the provider network. According to one embodiment of the invention, administration system 801 is similar in function to administration system 301 described above, and system 801 includes one or more subsystems. More particularly, the administration system 801 comprises a network information/registration system 802 and a filter policy administration system 805. Network information/registration system 802 is coupled to filter policy administration system 805 via link 809. Link 809 may be, for example, a network link through which system 802 and system 805 communicate (e.g., a network) or may be any other method of communication (e.g., interprocess communication). Further, systems 802 and 805 may be implemented as separate systems coupled by one or more networks and/or communication systems. The filter policy administration system 805 is connected to a network communication system 303 via link 810.

Network information/registration system 802 maintains memories 803 and 804. Memory 803 may store a database of the provider network's resources, the subscriber networks connected to the provider network, and the administrators (if any) of the subscriber networks. Memory 804 may store an association of resources to the subscribers and the subscriber's administrators. The association of resources to subscribers and resources to administrators may take the form of access rulesets, described above in relation to FIG. 7. Memories 803-805 may be, for example, storage locations one or more memory devices, such as for example RAM, cache, disk, or other device.

Filter policy administration system 805 includes memories 806, 807, and 808. Memory 806 may store rules that are currently being implemented by the administration system 801. Memory 807 may store an association of implemented rules to subscribers and administrators. Memory 808 may include historical data, such as when a rule was removed and by whom.

It should be appreciated that the filter policy administration system and the network information/registration system could be implemented in any number of ways, including, but not limited to, hardware, software and embedded systems on general purpose or specialized purpose computers. The filter policy administration system and network information/registration system could also be implemented distributively across several general purpose or specialized purpose computer systems. Furthermore, the filter policy administration system and network information/registration system could be implemented in the same device, or in the same software application on a device or access several devices.

It should also be appreciated that the memories 803, 804 and 806-808 could be implemented in multiple data storage devices in different portions of the same data storage device, or in any other storage configuration. In addition, the data held in the memories 803, 804 and 806-808 could be interleaved in the same memory space in a data storage device. The data may also be distributively stored over several data storage devices. The invention is not limited to a particular organization of the filter policy administration system, the network information/registration system or the memory system, or storage location or arrangement of data.

Figure 9:
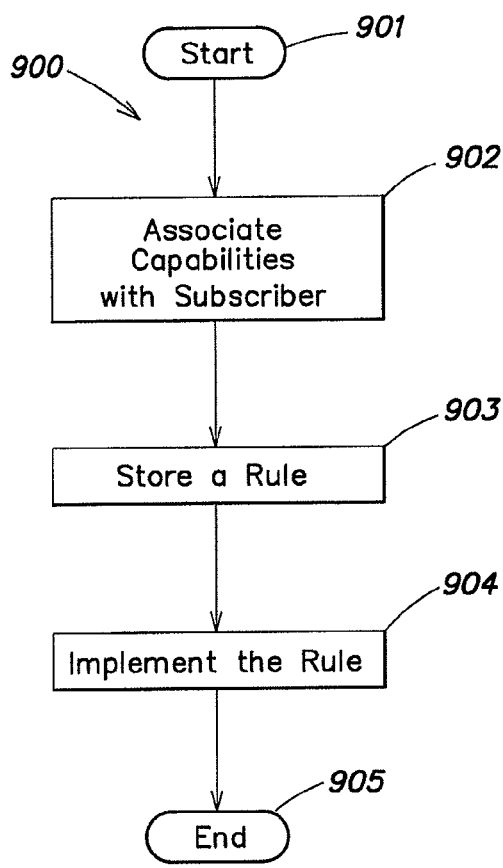
FIG. 9 is a flow diagram of a process for associating capabilities to subscribers in accordance with one embodiment of the invention.

According to an aspect of one embodiment of the invention, an interaction of network information/registration system 802 and filter policy administration system 805 is shown generally in FIG. 9. The process 900 begins at block 901, and proceeds to block 902. At block 902, capabilities are associated with the subscriber. The capabilities are related to services provided by the provider to the subscriber. A rule, generally related to the capabilities, is stored at block 903. Process 900 then continues on to block 904, in which the rule is implemented. Process 900 ends at block 905.

It should be appreciated that the implementation of the rule may involve translating the rule into one or more configuration information items. Alternatively, the rule may comprise one or more configuration information items, e.g., a filter entry located in a memory of a router.

Figure 10:
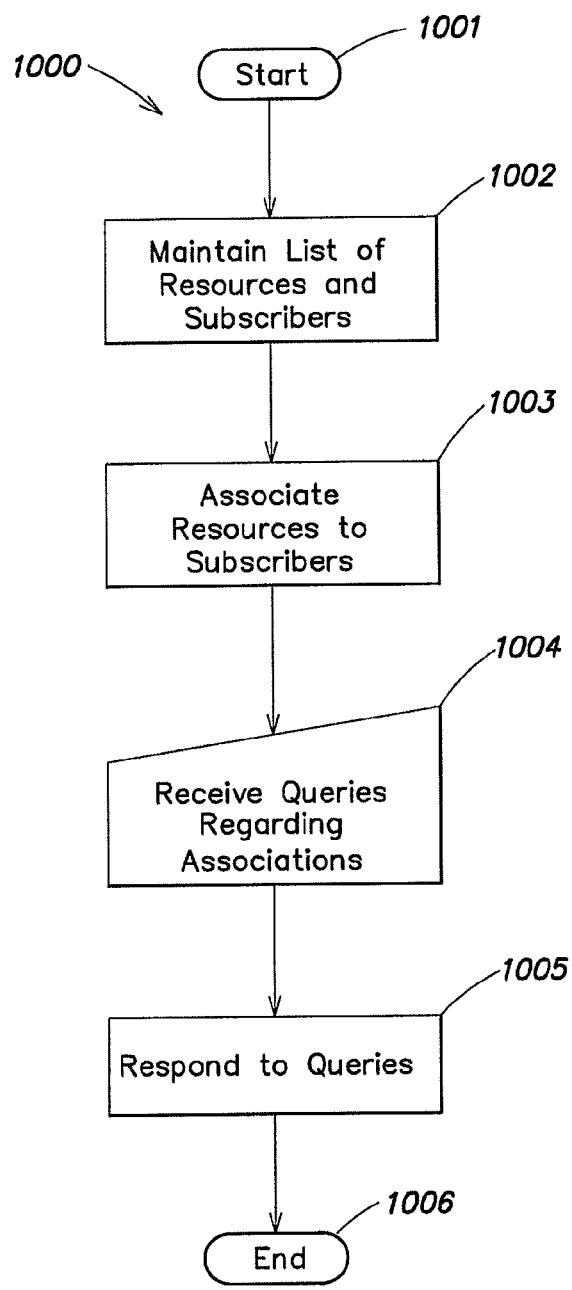
FIG. 10 is a flow diagram of a process for maintaining resource associations in accordance with one embodiment of the invention.

The process for associating resources with subscribers shown in FIG. 10 may be performed by network information/registration system 802. Process 1000 begins at block 1001. At block 1002, the network information/registration system 802 maintains the lists of resources and subscribers. This may include storing the lists and updating the lists if new resources and/or subscribers have been added, for example. The lists of subscribers may include lists of administrators and the subscriber networks that they manage. After block 1002, process 1000 proceeds to block 1003, wherein the resources are associated to subscribers. This may include, for example, updating any changes in association between resources and subscribers and associating resources to administrators. At block 1003, process 1000 may generate a listing of associations that may take the form of, for example, access rulesets. Process 1000 receives queries regarding the associations at block 1004. Queries may be generated by subscribers, subscribers' administrators, or the provider's staff. Network information/registration system 802 may be capable of responding to many statistical queries regarding the associations, such as, for example, percentages of the provider network's resources associated to particular subscribers and administrators. At block 1005 the network information/registration system 802 responds to the queries received in block 1004. Process 1000 ends at block 1006.

It should be appreciated that the invention is not limited with regard to the processes performed in the aforementioned implementations. For example, a system acting instead of or in conjunction with the network information/registration system 802 could perform process 1000. Further, the network information/registration system 802 may perform processes in addition to that shown in FIG. 10.

Figure 11:
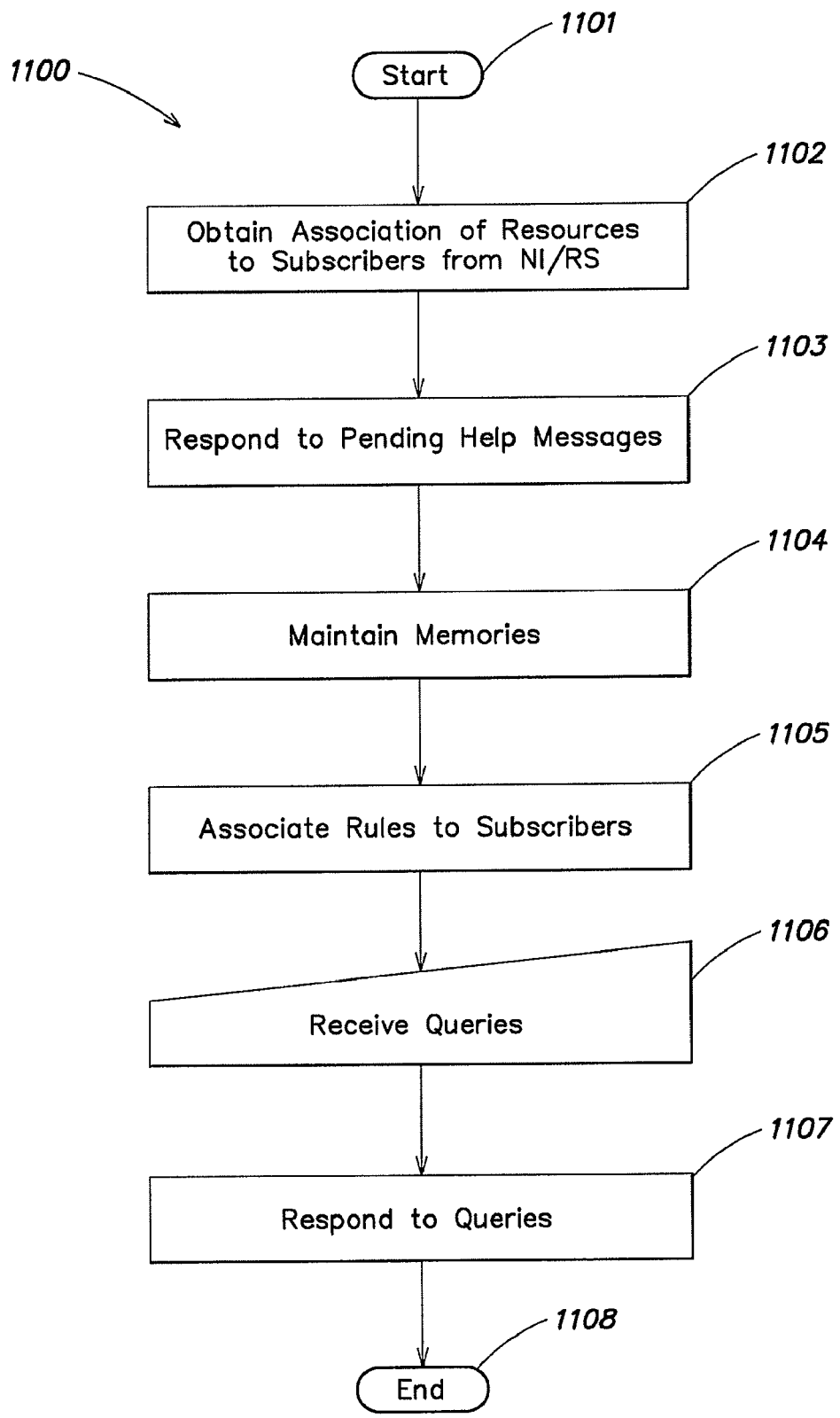
FIG. 11 is a flow diagram of a process for maintaining memories accordance with one embodiment of the invention.

A process particularly performed by a filter policy administration system according to one embodiment of the invention is shown in FIG. 11. Process 1100 of FIG. 11 begins at block 1101. At block 1102, the filter policy administration system obtains an association of resources to subscribers from the network information/registration system 802. For example, these associations may be obtained using interprocess communication between the network information/registration system and filter policy administration system, such as, for example, by a protocol such as, for example, the Microsoft's Dynamic Data Exchange (DDE), Macintosh's Inter Application Communications (IAC), or Novell's Sequenced Packet eXchange (SPX) protocols. Further, associations may be obtained by communicating between processes over a communication network (e.g., Ethernet, etc.) using a communication protocol (e.g., TCP, UDP, etc.) It should be appreciated that any communication method may be used.

Once the filter policy administration server has obtained an association of resources to subscribers, the server responds, at block 1103, to pending help messages from subscribers. A help message is a request issued by a subscriber requesting network configuration change options. The filter policy administration system 805 is capable of surveying the provider's network communication system 303 (for example, by stateful inspection of the traffic on the network communication system) and composing network configuration changes that, when implemented, may provide enhanced performance to the subscriber. The block 1103 may include formulating network configuration change options for a subscriber or subscribers, sending the options to the subscriber(s) and receiving selections from the subscriber(s) that have pending help messages with the filter policy administration system.

In block 1104, the filter policy administration system 805 maintains memories 806-808. This may include, for example, implementing network configuration changes submitted to the filter policy administration system 805, removing expired rules, and storing rules in a historical database. After maintaining the memories in block 1104, process 1100 proceeds to block 1105, in which the rules are associated to subscribers. In block 1105 the rules may also be associated with one or more administrators.

Similar to the network information/registration system 802, the filter policy administration system 805 receives queries in block 1106. According to one embodiment of the invention, filter policy administration system 805 is capable of responding to queries relating to many topics, including, but not limited to, rules that are presently implemented or have been implemented in the past, associations of rules to subscribers and administrators, the scope of rules that subscribers desired to be implemented against the scope of rules that actually were implemented, and any subscribers that are under attack. Filter policy administration system 805 may be capable of receiving queries from the provider, administrators and processes, for example. The queries may be submitted, for example, for the purposes of archiving network activity, performing statistical analysis and observing network usage. In block 1107, the filter policy administration system 805 responds to the queries received in block 1106. Process 1100 ends at block 1108.

Figure 12:
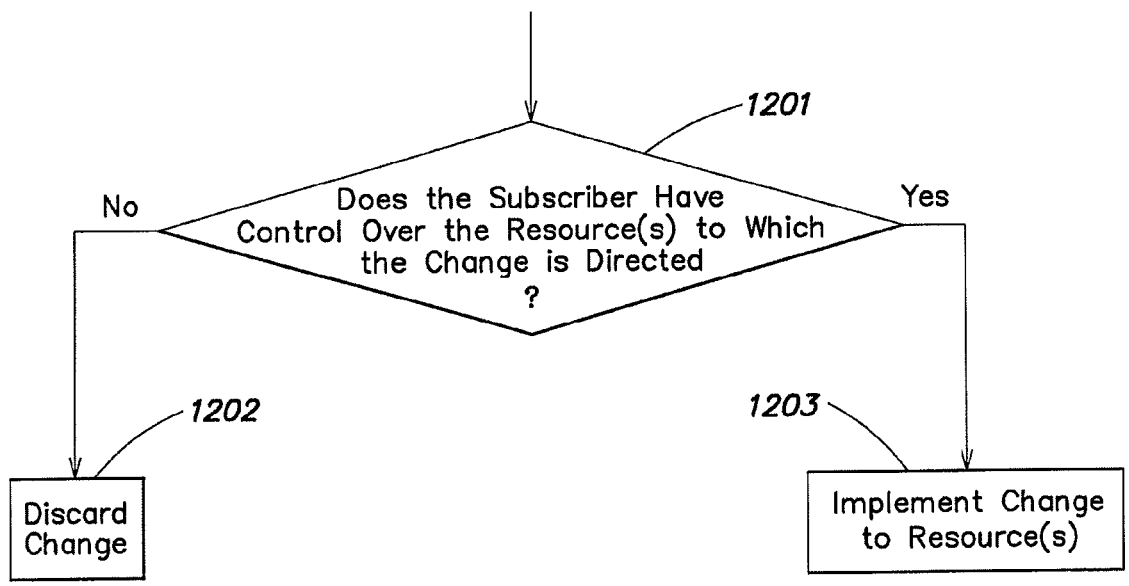
FIG. 12 is a flow diagram of a process for implementing a change in accordance with one embodiment of the invention.

An example of how rules may be implemented is shown in FIG. 12. In block 1201 a rule is examined to determine if the subscriber has control over the resource to which the network change of the rule is directed. If not, the rule is simply discarded at block 1202. If the subscriber does have control over the resource, the change is implemented to the resource at block 1203. This may be performed, for example, by the filter policy administration server delivering the rule to the network communication system, which then performs the necessary actions to put the change into effect.

Figure 13:
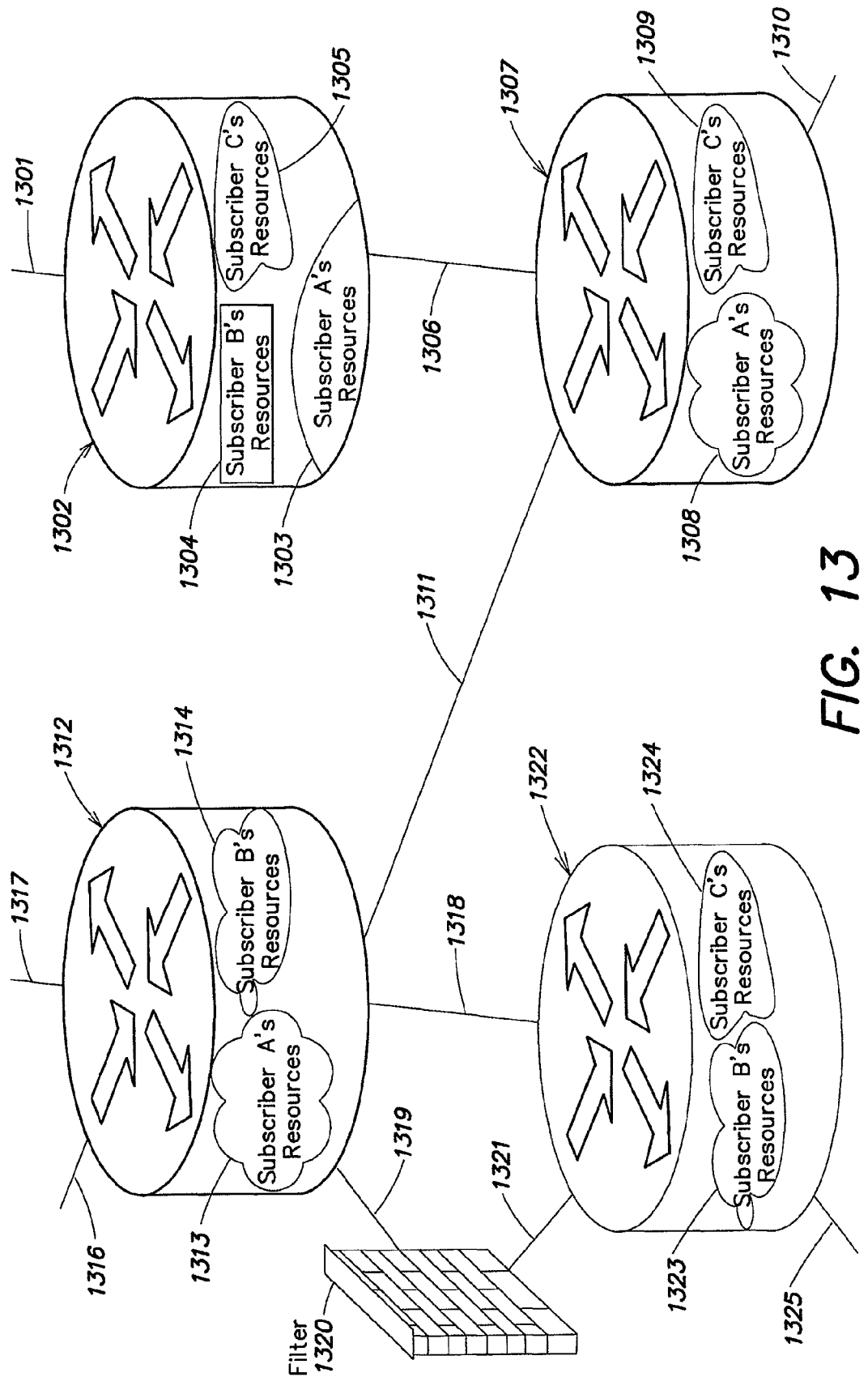
FIG. 13 shows a network communication system that manages resources according to one embodiment of the invention.

An example of a provider network communication system in which the administration system may be used is illustrated in FIG. 13. The network communication system is connected to a NAP by trunk link 1301. Edge router 1302 is coupled to trunk link 1301. Router 1307 is coupled to edge router 1302 by link 1306. Link 1310 couples a subscriber network to the network communication system. Router 1312 is connected to router 1307 by link 1311. A subscriber network is connected to the network communication system by link 1316. Link 1317 connects the network communication system to the administration system. Router 1322 is connected to router 1312 by link 1318 and by links 1319 and 1321 and filter 1320. Another subscriber network may be connected to the network communications system by link 1325.

Resources that are under the control of particular subscribers are located on each of the routers. Each router, except for router 1322, is capable of filtering traffic. Router 1322 is capable of routing traffic through filter 1320. To implement a rule on behalf of a subscriber, the administration system contacts the appropriate router or routers holding the subscriber's resources that will undergo the network configuration change.

Consider, for example, that subscriber B's network is connected to the network communication system via link 1316, and subscriber B wants to filter out traffic from a particular host entering the provider network on link 1325. In this case, network B sends a message to the administration system that travels over link 1316, through router 1312 and to the administration system over link 1317. The administration system receives the request in the form of, for example, a network configuration change or a selection of an option provided to subscriber B by the administration system (e.g., "block traffic from dexter.arbor.net," "set aside 128 Kbps for video traffic," etc.). The administration system contacts the router 1322 to instruct it, perhaps by adding a route to the routing table, to route through filter 1320 packets from the particular host and destined for subscriber B's network. The administration system next contacts the filter 1320 to direct it, perhaps by adding a filter policy rule that causes the filter 1320 to drop packets from the particular host destined for subscriber B's network. A rule representing the network configuration change may then be stored in a database by the administration system.

It should be noted and appreciated that the administration system may have several connections to the network communication system, even though only one is illustrated in FIG. 13. Furthermore, the subscribers need not communicate with the administration system through the network communication system. A subscriber may be connected to the administration system by a separate dedicated link. Also, bandwidth in the network communication system could be set aside solely for communications between the subscriber and administration system and between the network communication system and the administration system. The invention should not be considered limited in this regard.

Figure 14:
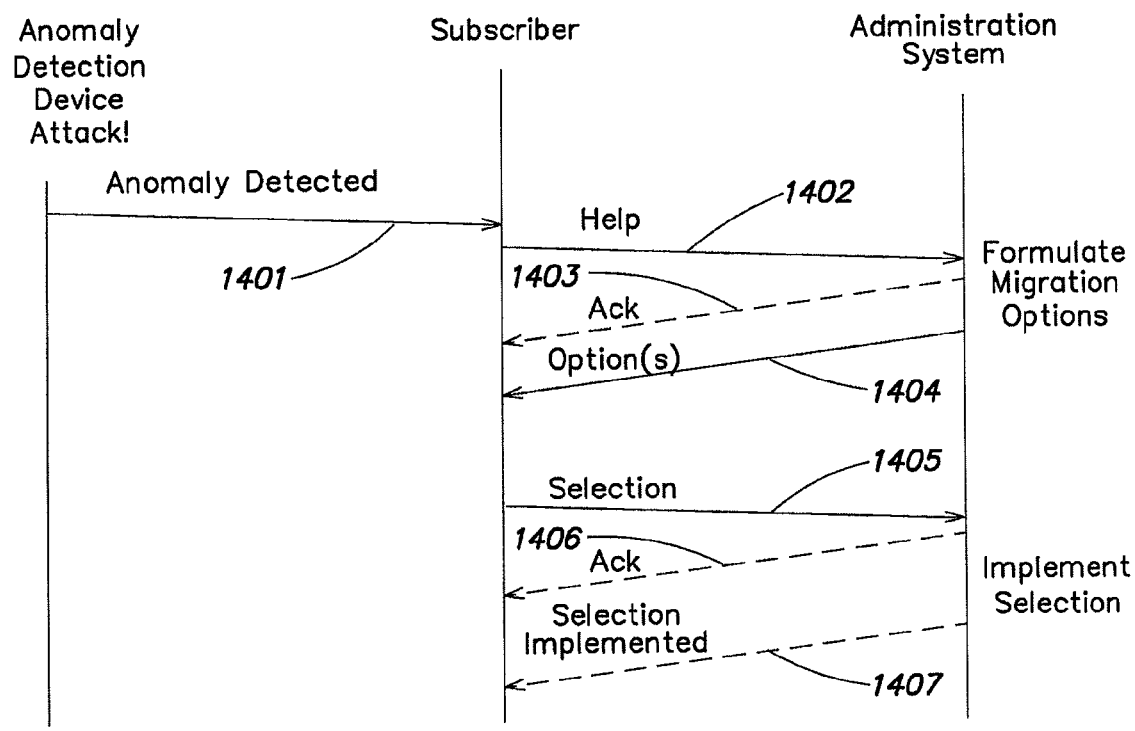
FIG. 14 shows a timeline of communication between a provider and subscriber according to an embodiment of the invention.

FIG. 14 illustrates a specific application in which the administration system 310 described above may be used. For example, the scenario shown in FIG. 14 relates to a denial of service attack on a subscriber. The scenario begins with an anomaly detection mechanism, located either within the provider network or within the subscriber's network, detecting an attack. The anomaly detection mechanism may be a general purpose or special purpose device, or may be a program running on such a device. A denial of service attack may be detected, for example, by observing a sudden and marked increase in traffic originating from a particular network or host.

When the attack is detected, the anomaly detection mechanism notifies the subscriber with notification 1401. Notification 1401 may be an email or specialized message, and it may initialize a graphical user interface (GUI) on a host device at the subscriber network, for example. In response to notification 1401, the subscriber may send a help message 1402 to administration system 310. Sending help message 1402 may be achieved by sending a specially formatted email having contents that indicate a request for mitigation options, or by selecting a button on a GUI, for example. Help message 1402 may be sent over a dedicated link, for example, a telephone or wireless link, and may be encrypted.

Administration system 310, upon receipt of help message 1402, formulates mitigation options as described above. Administration system 310 may send an acknowledgment 1403 to the subscriber to acknowledge receipt of help message 1402. Acknowledgment 1403 may be sent by the same method used by the subscriber in sending help message 1402 and may trigger a response in the aforementioned GUI, or may initiate a separate mitigation GUI, for example. Once the mitigation options are formulated, administration system 310 delivers options 1404 to the subscriber. Options 1404 may be transmitted over a dedicated link or established connection between the subscriber and administration system 310.

Options 1404 may, for example, appear to the subscriber in a GUI window or may form the text of an email message. The subscriber makes a selection by pressing a radio button or responding to the email with his selection, for example. The subscriber's selection is communicated to administration system 310 in the form of selection 1405, communicated by, for example, any of the means mentioned above.

The administration system 310 may acknowledge receipt of selection 1405, and send acknowledgment 1406 that acknowledges the reception of selection 1405. Once selection 1405 is implemented, the administration system 310 may further send a message 1407, indicating that the selection has been implemented. Message 1407 may, for example, appear in the mitigation GUI or another user interface such as a browser.

Although FIG. 14 illustrates one example of a scenario in which various aspects of the invention may be implemented, it should be appreciated that other applications of the invention to distributing control over resources to subscribers may be possible, and the invention is not limited to any particular implementation.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method for managing a network configuration of a provider network, comprising:
a memory; and a processor, wherein the processor is configured to perform the steps of determining, by an administration system, a first network resource supported by at least one network communication system over which a subscriber has control wherein the first network resource provides network services to the subscriber and network services to other subscribers; receiving, at the administration system, at least one network configuration change from the subscriber, the at least one network configuration change being related to the first network resource; detecting, by a network management system associated with the administration system, a denial of service attack on the subscriber; sending, to a host device operated by the subscriber, a message indicating the denial of service attack; providing, by the administration system in an interface, to the subscriber with a plurality of mitigation options within the interface, wherein the at least one network configuration change is represented by at least one of the plurality of mitigation options; restricting, by the administration system, implementation of the at least one network configuration change to the at least one network communication system that affects the network services provided to the subscriber and not to configuration changes to the at least one network communication system that affect network services provided to other subscribers; and responsive to the subscriber selecting the at least one of the plurality of mitigation options, performing, by the administration system, a network configuration change to the at least one network communication system that supports the first network resource; determining a second network resource over which a second subscriber has control; receiving a second network configuration change from the second subscriber, the second network configuration change being related to the second network resource; implementing the received second network configuration change; and denying, to the subscriber, control over the second network resource.

2. The method of claim 1, further comprising: providing at least one network configuration option to the subscriber.

3. The method of claim 2, wherein the at least one network configuration option includes a change in a router configuration.

4. The method of claim 2, wherein the at least one network configuration option includes a filtering configuration.

5. The method of claim 2, wherein the received at least one network configuration change includes the at least one network configuration option.

6. The method of claim 1, further comprising: verifying an identity of the subscriber to permit the act of implementing the received network configuration change.

7. The method of claim 1, wherein the first network resource includes at least one filter policy.

8. The method of claim 1, wherein the first network resource includes a network route.

9. The method of claim 1, wherein the network configuration change affects only the first network resource.

10. The method of claim 1, wherein the first network resource is located within the provider network.

11. The method of claim 1, wherein the network configuration change affects an entity located in the provider network.

12. The method of claim 1, wherein the network configuration change affects at least one service provided to the subscriber.

13. The method of claim 1, wherein the network configuration change affects an entity under control of the provider.

14. The method of claim 1, wherein the first network resource includes a routing entry stored in a memory of a network communication system.

15. The method of claim 14, wherein the network communication system is a router.

16. The method of claim 1, wherein the first network resource includes a filter entry stored in a memory of a network communication system.

17. The method of claim 16, wherein the network communication system is a router.

18. The method of claim 16, wherein the network communication system is a bridge.

19. The method of claim 1, wherein providing the subscriber with a mitigation option comprises providing the subscriber with a plurality of mitigation options, and wherein the at least one network configuration change is one of the plurality of mitigation options.

20. The method of claim 1, wherein the subscriber owns a network, the method further comprising determining an amount of a subscriber network afflicted by the denial of service attack.

21. The method of claim 20, wherein the mitigation option is based on the amount of the subscriber network afflicted by the denial of service attack.

22. The method of claim 1, further comprising determining a source of the denial of service attack.

23. The method of claim 22, wherein the mitigation option is based on the source of the denial of service attack.

24. The method of claim 1, further comprising alerting the subscriber of the denial of service attack.

25. The method of claim 1, wherein detecting the denial of service attack comprises receiving, from the subscriber, an indication that the subscriber is under attack.

26. The method of claim 1, further comprising: providing network configuration options to the subscriber.

27. The method of claim 26, wherein the received network configuration change includes one of the network configuration options.

28. The method of claim 1, further comprising:
determining a second network resource over which a second subscriber has control; and
denying, to the subscriber, control over the second network resource.

29. The method of claim 28, further comprising:
receiving a second network configuration change from the second subscriber, the second network configuration change being related to the second network resource; and
implementing the received second network configuration change.

30. The method of claim 28, wherein the first network resource and the second network resource are not the same.

31. The method of claim 28, wherein the second network configuration change affects at least one service provided to the second subscriber.

32. A method of claim 1, wherein the subscriber has a first administrator and a second administrator, and the first network resource includes a second network resource and a third network resource, the method further comprising:
assigning control of the second network resource to the first administrator;
assigning control of the third network resource to the second administrator;
receiving a second network configuration change from the first administrator, the second network configuration change being related to the second network resource; and
implementing the received second network configuration change.

33. The method of claim 32, wherein the second network resource and the third network resource are not the same.

34. The method of claim 32, wherein the second network resource includes the third network resource.

35. The method of claim 32, further comprising: providing a network configuration option to the first administrator.

36. The method of claim 35, wherein the second network configuration change submitted by the first administrator includes the network configuration option.

37. The method of claim 32, further comprising:
verifying the identity of the first administrator to permit the act of implementing the received second network configuration change.

38. The method of claim 32, wherein the second network resource includes at least one filter policy.

39. The method of claim 32, wherein the second network resource includes a network route.

40. The method of claim 32, wherein the second network configuration change affects only the second network resource.

41. The method of claim 32, wherein the second network resource is located within the provider network.

42. The method of claim 32, wherein the second network configuration change affects an entity located in the provider network.

43. The method of claim 32, wherein the second network configuration change affects at least one service provided to the subscriber.

44. The method of claim 32, further comprising:
receiving a third network configuration change from the second administrator; and
implementing the received third network configuration change submitted by the second administrator.

45. The method of claim 44, further comprising: providing a second network configuration option to the second administrator.

46. The method of claim 45, wherein the third network configuration change includes the second network configuration option.

47. The method of claim 44, further comprising:
verifying the identity of the second administrator to permit the act of implementing the received third network configuration change.

48. The method of claim 46, wherein the second network configuration option includes at least one of the group comprising:
(a) adding, to a network communication device, a filter entry; and
(b) modifying, in the network communication device, a network route.

49. The method according to claim 1, wherein the act of providing, by the administration system within the interface, to the subscriber with a plurality of mitigation options within the interface comprises hiding implementation details of configuration changes associated with the plurality of mitigation options from the subscriber.

50. The method according to claim 1, wherein the act of performing, by the administration system, a network configuration change includes applying, by the administration system, the network configuration changes across multiple network communication systems.

* * * * *